Jan. 30, 1962 W. VOIGT 3,018,985
SWEPT WING WITH UNSWEPT SPAR
Filed Dec. 31, 1956 6 Sheets-Sheet 1
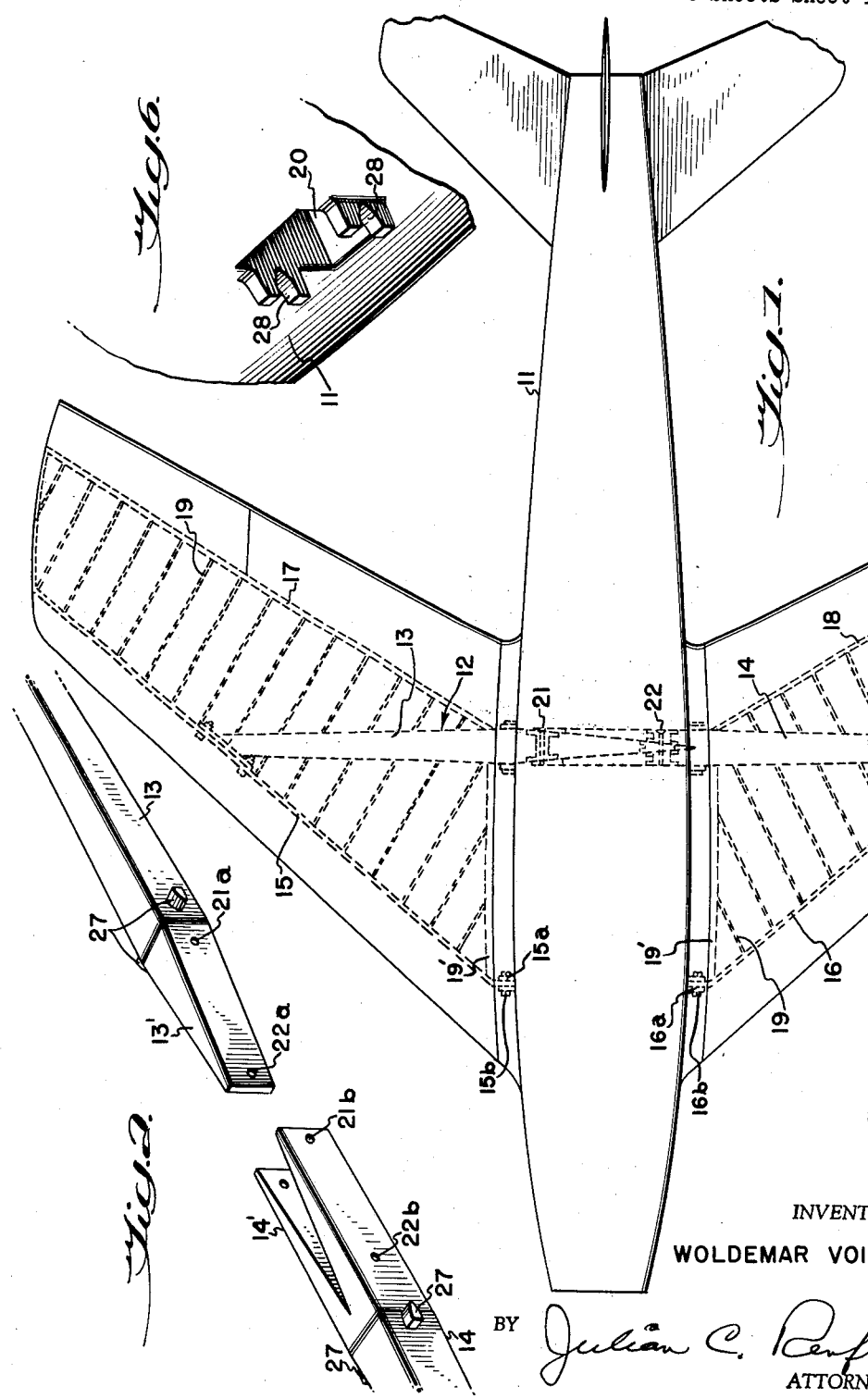
INVENTOR
WOLDEMAR VOIGT
BY Julian C. Renfro
ATTORNEY

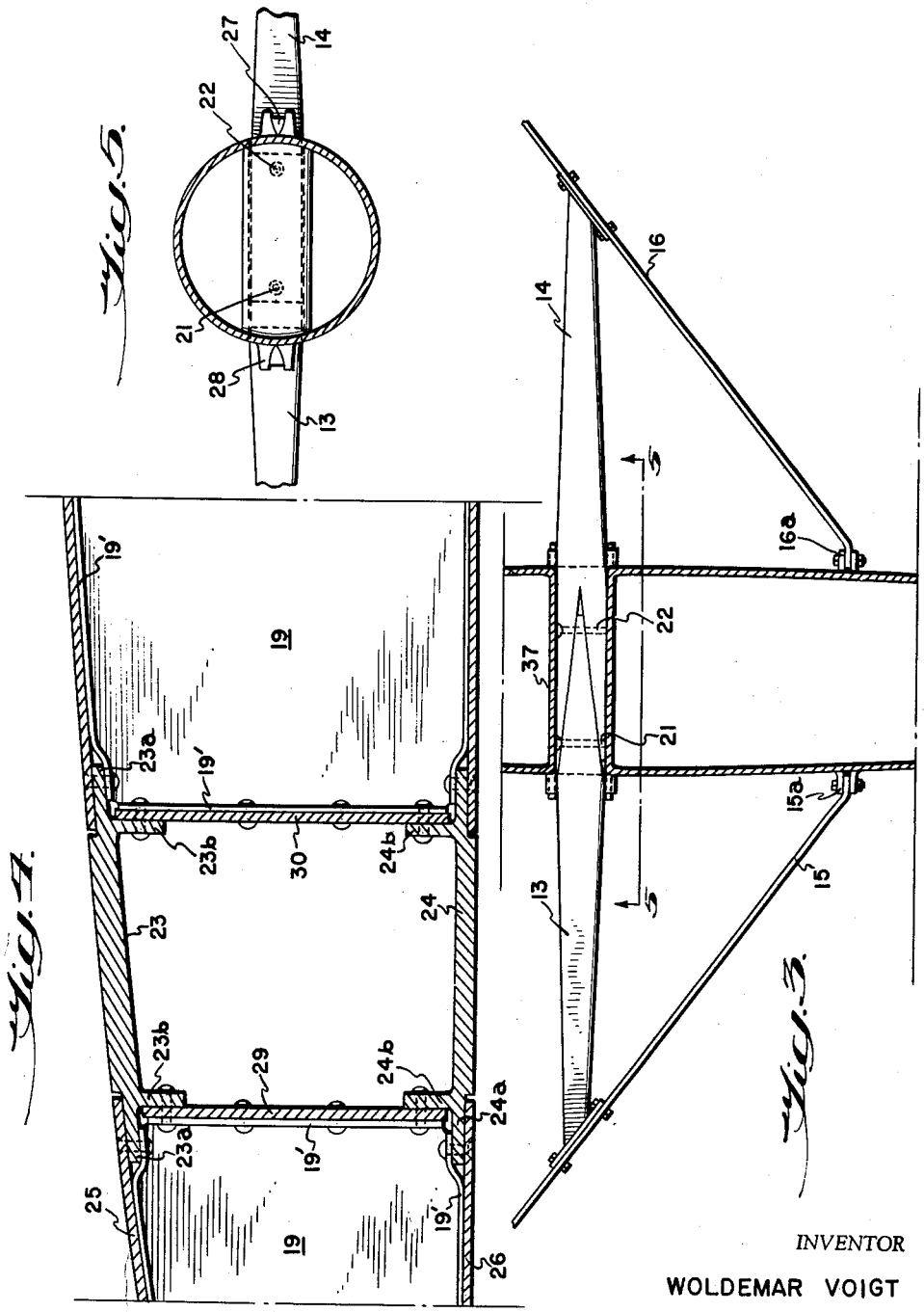

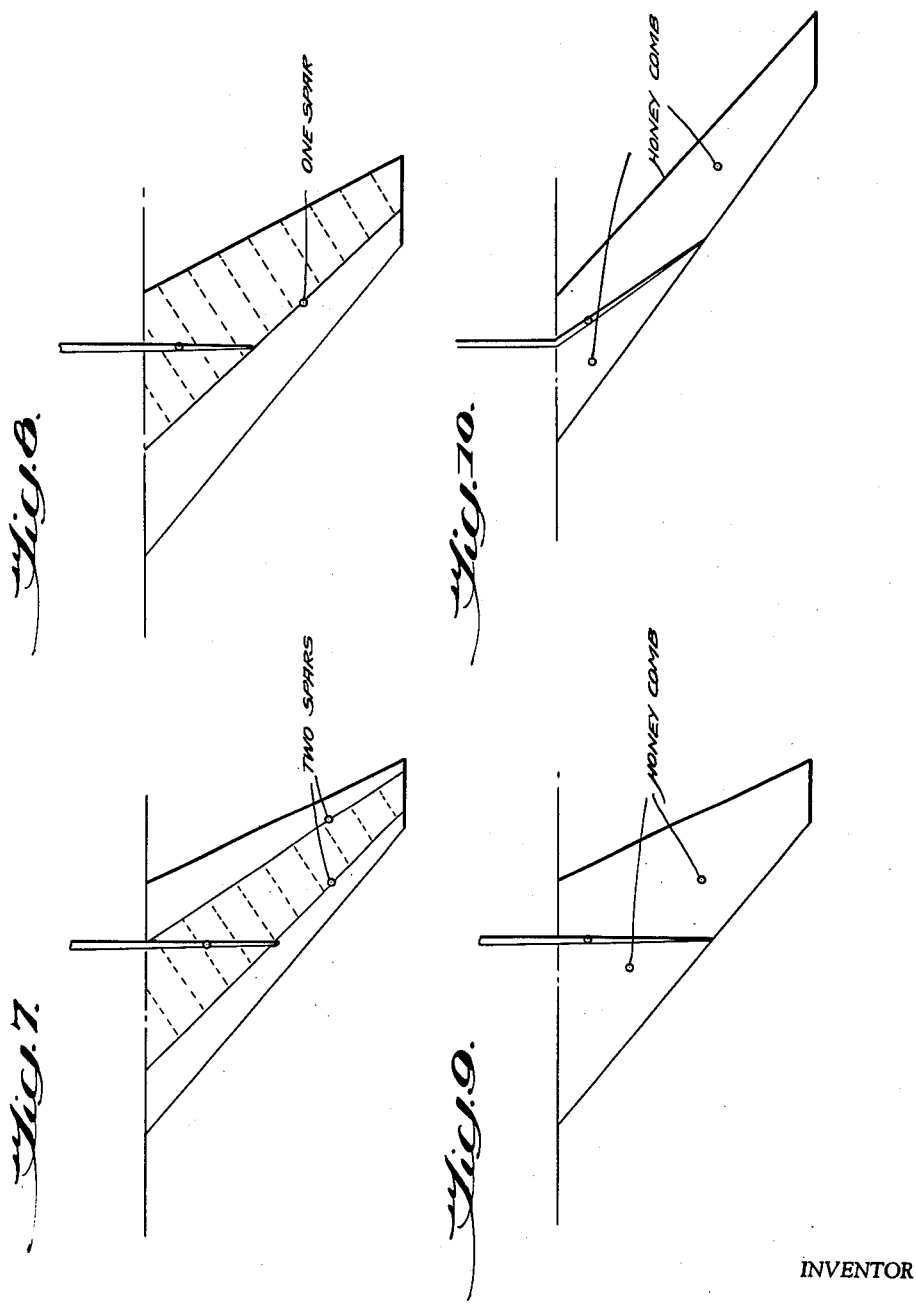

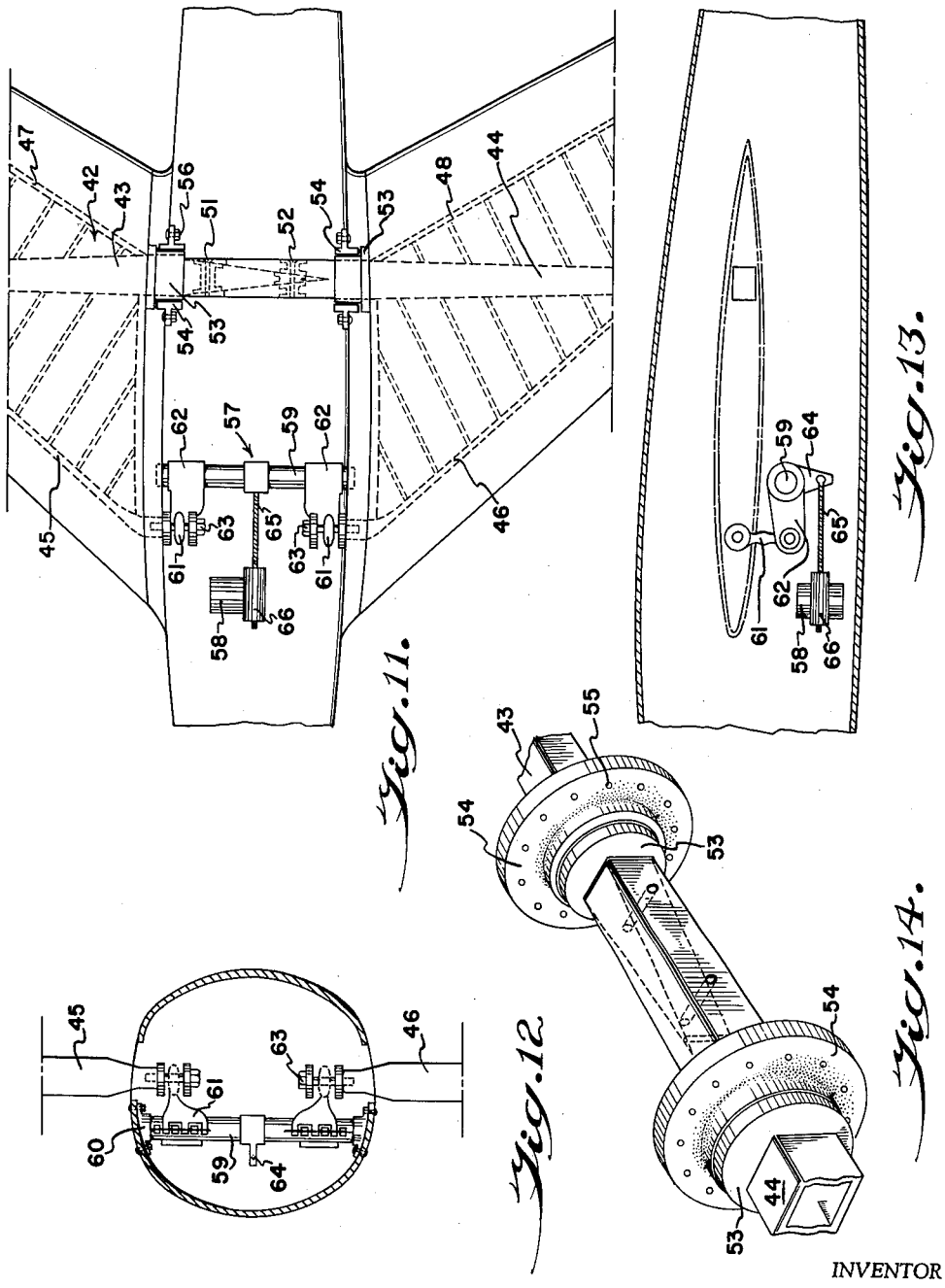

Jan. 30, 1962 W. VOIGT 3,018,985
SWEPT WING WITH UNSWEPT SPAR
Filed Dec. 31, 1956 6 Sheets-Sheet 5
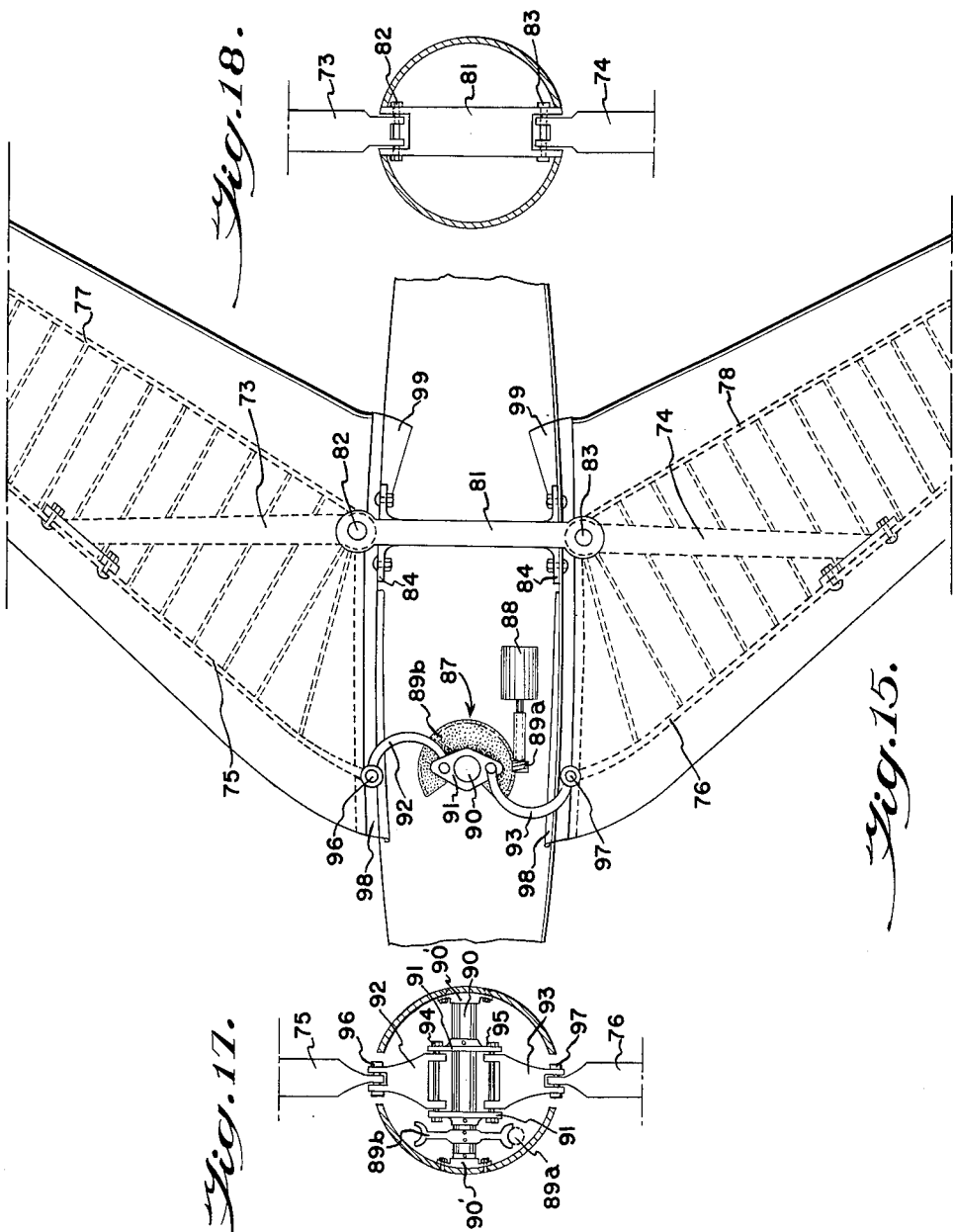
INVENTOR
WOLDEMAR VOIGT Jan. 30, 1962 W. VOIGT 3,018,985
SWEPT WING WITH UNSWEPT SPAR
Filed Dec. 31, 1956 6 Sheets-Sheet 6

INVENTOR
WOLDEMAR VOIGT
BY
ATTORNEY

United States Patent Office 3,018,985
Patented Jan. 30, 1962

3,018,985
SWEPT WING WITH UNSWEPT SPAR
Woldemar Voigt, Towson, Md., assignor to Martin-Marietta Corporation, a corporation of Maryland
Filed Dec. 31, 1956, Ser. No. 631,638
16 Claims. (Cl. 244—46)

This invention relates to wing structure for an aircraft, and more particularly to an unswept stress transmitting structure for a swept wing.

With the advent of swept wings, the problem of wing construction becomes vastly more difficult. This is because the stress carrying members of the wing usually form a bent structure, and as a result of this curvature, the shear and bending loads acting in each wing half have to take a comparatively long path to the reacting vertical force at the fuselage and to the reacting moment from the other wing. The high weight necessarily associated with such construction is produced not only directly by the length of the structural members required but also by the fact that these greater lengths result in greater bending moments, which, in turn, necessitate the use of wing members of substantial strength. Furthermore, additional bending moments are produced in the fuselage to counteract one component of the wing bending moment at the wing root, and additional weight increase in the fuselage is thereby necessitated.

Various types of constructions have been proposed for swept wings, and one of these types, a stressed skin wing having no spars whatever has been used extensively. According to this technique, a slab of aluminum of considerable thickness and of a size corresponding to the entire area of the swept wing is placed in a milling machine. Then, much of the original slab of aluminum is milled away so that the resulting wing skin will be comparatively thin at the tips, and having a thickness corresponding to the original thickness of the slab only at the point or points at which it is to be attached to the fuselage. This technique is very expensive and time consuming, and inasmuch as approximately 90% of the aluminum of the original slab is milled away, it is exceedingly wasteful. The comparatively great local thickness of this type of wing skin is, of course, occasioned by the fact that it is necessary to collect the stresses distributed throughout the entire wing skin into comparatively small points for attachment to the fuselage, or into a small box of the wing that goes through the fuselage.

In addition to being very expensive, the foregoing stressed skin wing is exceedingly hard to transport. This is because although the span might easily be short enough to allow the wing to be placed, for example, in a railroad car, the sweep of the wing makes such transportation impossible because of the fact that the forwardmost portion of the wing is a considerable distance forward of a straight line connecting the tips of the wing, and such highly bent construction therefore would necessitate the wing extending either for a great height above the railroad car, or else require considerable space extending out from both sides of the car.

For these reasons, it is often necessary to construct aircraft having separate right and left wings. In a typical prior art design, literally hundreds of bolts are employed to fasten the upper and lower wing skin fittings of a wing half to the structural members of the fuselage and/or to the other wing half. Examples of this type of construction are the tension bolt splice and the shear bolt splice. In addition to adding considerable weight, the many bolts and corresponding fittings used according to such technique present a technical problem of a great order of magnitude insofar as replacement of wings is concerned. Because the drilling of 50 to 300 holes in each wing root and in each side of the fuselage structure is involved, it has been an extremely difficult job to substitute a replacement wing for the original wing, and be able to line up the holes properly. Therefore, when a wing is to be replaced, it is necessary to redrill the holes and to replace parts in the fuselage and/or wings to take up the new holes.

According to the present invention, a swept wing is provided in which the critical part of the bending structure is not swept or possesses very little sweep, therefore being substantially lighter than the corresponding structure of a swept wing according to the prior art. The principal bending member of the wing as a whole is a main spar arranged at substantially right angles to the direction of flight of the aircraft, which spar is structurally connected to each wing panel in such a way that at least the vertical loads from the wing are transmitted to the main spar. This main spar is substantially straight and can be connected to each wing half at a few points located along the spar, such as to swept front and rear spars, or at many points along the length of the main spar as it extends into the wing half, such as to the wing ribs and other internal structure members. As another alternative, the connections of the main spar to the wing halves may be in the form of distributed shear fasteners along the front and rear faces of the spar. If honeycomb construction be utilized, these fasteners could take the form of bonding joints between the spar and a honeycomb core of the wing.

In addition to this structural attachment for vertical loads, a shear connection may be provided between the wing skin and the spar caps, which will transmit the tension and compression loads carried in the wing skin directly into the spar caps. In this type of construction, the collecting into the spar of the load from all of the individual "fibers" of a stressed wing skin occurs without any load concentration in the skin itself, consequently eliminating the necessity for areas of locally high wing thickness. This is because the spar itself goes through the wing panel at an angle so that it directly is in contact with every fiber of the skin.

When the main spar is thus secured along its length to the wing skin, according to a preferred embodiment of this invention, the main spar is typically employed in conjunction with a structural wing box in each wing half comprising a front spar, a rear spar, and ribs connecting the spars and the upper and lower skins of the wing. This structural box amounts to a bending member which represents the structural backbone of each wing half. It is important to note that this structural member or box is not fastened in the conventional fashion to the fuselage so that the box throughout its whole length would become a bending member with maximum moment at the root. Rather, this box is placed over the main spar in much the manner as a finger of a glove would be pushed over the respective finger of a wearer's hand. Because of this type of construction, the wing box is a bending member which has to transmit bending by less than the whole length of the wing; bending moments are transmitted from the tip and the root of the wing to the unswept spar, and the maximum bending in the wing occurs where the wing is supported by the spar. By virtue of this construction, each fiber of the skin of the wing transmits its load directly into the spar without any load concentration in the skin itself and consequently without the necessity for areas of high local skin thicknesses, for as previously mentioned, the spar itself goes through the wing panel, and is secured directly to every fiber of the skin. Since the spar takes the vertical loads out of the wing proper not only at the root, but also over an appreciable part of the span, the loads carried in the wing skin near the root are reduced appreciably and a smaller skin thickness is required at the wing root. It is, therefore, to be seen that the problems relating to the use of a tapered wing skin are very considerably alleviated.

That weight may be minimized, the main spar is advantageously placed in such a way that the centers of lift of the wing halves will occur very close to, if not directly on the spar. Because the spare is straight, it is necessarily the shortest line of connection between the wing lift on the right wing and the wing lift on the left wing. This amounts to the smallest bending moments, the smallest length and, therefore, the greatest possible saving in weight.

It is, of course, not always possible to design an airplane entirely around the concept of a straight spar so as to have the spar passing through the centers of lift of the wings. Therefore, compromises are very often being made between the truest possible incorporation of this invention, and practical considerations of the airplane design. For instance, when an airplane is designed having wings with says 45° sweep and a high aspect ratio, since the previously described straight spar would necessarily extend far in front of the aerodynamic lift of the wing and also be very short in length, the main spar in such instance would be straight as it extends through the fuselage, but swept in each wing to an amount substantially less than the sweep of the wings.

A wing constructed according to this invention in the manner described has the very great advantage of being easily removable. The main spar of each wing may be provided with a joint that occurs approximately on the center line of the fuselage. A portion of the main spar of each wing may extend inboard of the wing root and be provided with a spliced joint. This joinder between the ends of the spars is of such a nature that the main spars of each wing can be held together by a minimum number of fasteners. As an example, either a single bolt and a pin or else two bolts can be used to secure the main wing spar together. Because of the wing torsion involved in such conditions as flap and aileron actuation, two additional bolts are usually required to secure the front spars to their respective fittings on the fuselage to complete the attachment procedure. It is, therefore, to be seen that the attachment of wing to fuselage is effected by the use of merely three or four bolts rather than several hundred bolts according to the prior art. Because of this arrangement, interchangeability of wings is not only feasible, but practical and transportation problems are greatly alleviated by the fact that wings may be transported as separate halves rather than a single long wing.

The unswept main spar for swept wings concept according to this invention may be utilized in the construction of wings of variable incidence and variable sweep, for the main spar in the simplified construction according to the present invention is, as previously described, the shortest connection between the centers of lift of the two wing halves. Therefore, in order to permit the wing to have variable incidence, it is only necessary to provide rotatable fittings where the main spar extends through the fuselage, and to permit variable sweep, it is only necessary to have vertical pivot axes approximately at the locations where the main spars pass through the fuselage wall. Appropriate mechanisms under the control of the pilot may be utilized to bring about these changes in incidence or sweep.

The invention will be further described in connection with the accompanying drawings, but it is to be understood that such further disclosure is by way of exemplification and the invention is not limited thereby, but only to the extent set forth in the appended claims.

In the drawings:

FIGURE 1 is a plan view of a fundamental embodiment of this invention, illustrating by use of broken lines the internal structure of the aircraft wings;

FIGURE 2 is an enlarged fragmentary view taken in perspective illustrating the manner in which the main spar portions may be joined together;

FIGURE 3 is a plan view similar to FIG. 1 but with much of the aircraft structure removed to reveal in greater detail the relationships of the main spar and the front spar;

FIGURE 4 is a typical cross-sectional view of the main spar;

FIGURE 5 is a cross-sectional view of the fuselage taken along line 5—5 on FIG. 3;

FIGURE 6 is a perspective view of a portion of the fuselage illustrating the use of a main spar-receiving aperture on the fuselage, to be utilized for wing installation;

FIGURE 7 is a simplified showing of the type of construction utilized in FIG. 1 wherein front and rear swept spars are employed;

FIGURE 8 is a simplified showing similar to FIG. 7, but illustrating an embodiment in which only a single swept spar is employed;

FIGURE 9 is a simplified showing of a wing utilizing honeycomb construction in conjunction with the unswept spar;

FIGURE 10 represents an embodiment much like that illustrated in FIG. 9 but in which the main spar possesses some sweep;

FIGURE 11 is an embodiment of this invention in which the unswept spar technique is utilized in a wing in which the angle of incidence may be varied;

FIGURE 12 is a front elevational view of the embodiment shown in FIG. 11 revealing details of the incidence varying mechanism;

FIGURE 13 is a side elevational view of the embodiment shown in FIG. 11, revealing other details of the incidence varying mechanism;

FIGURE 14 is a fragmentary perspective view of the main spar splicing detail, revealing the bearings in which the main spar ends are rotatable;

FIGURE 15 is another embodiment of this invention in which the sweep of the wings is variable, this figure revealing the mechanism attached to the front spars of the wing to bring about such changes in sweep;

FIGURE 17 is a front elevational view of the embodiment shown in FIG. 15, revealing certain details of the sweep mechanism; and FIGURE 18 is a similar elevational view but taken from the rear to reveal the main spar attachment details.

Figure 16:
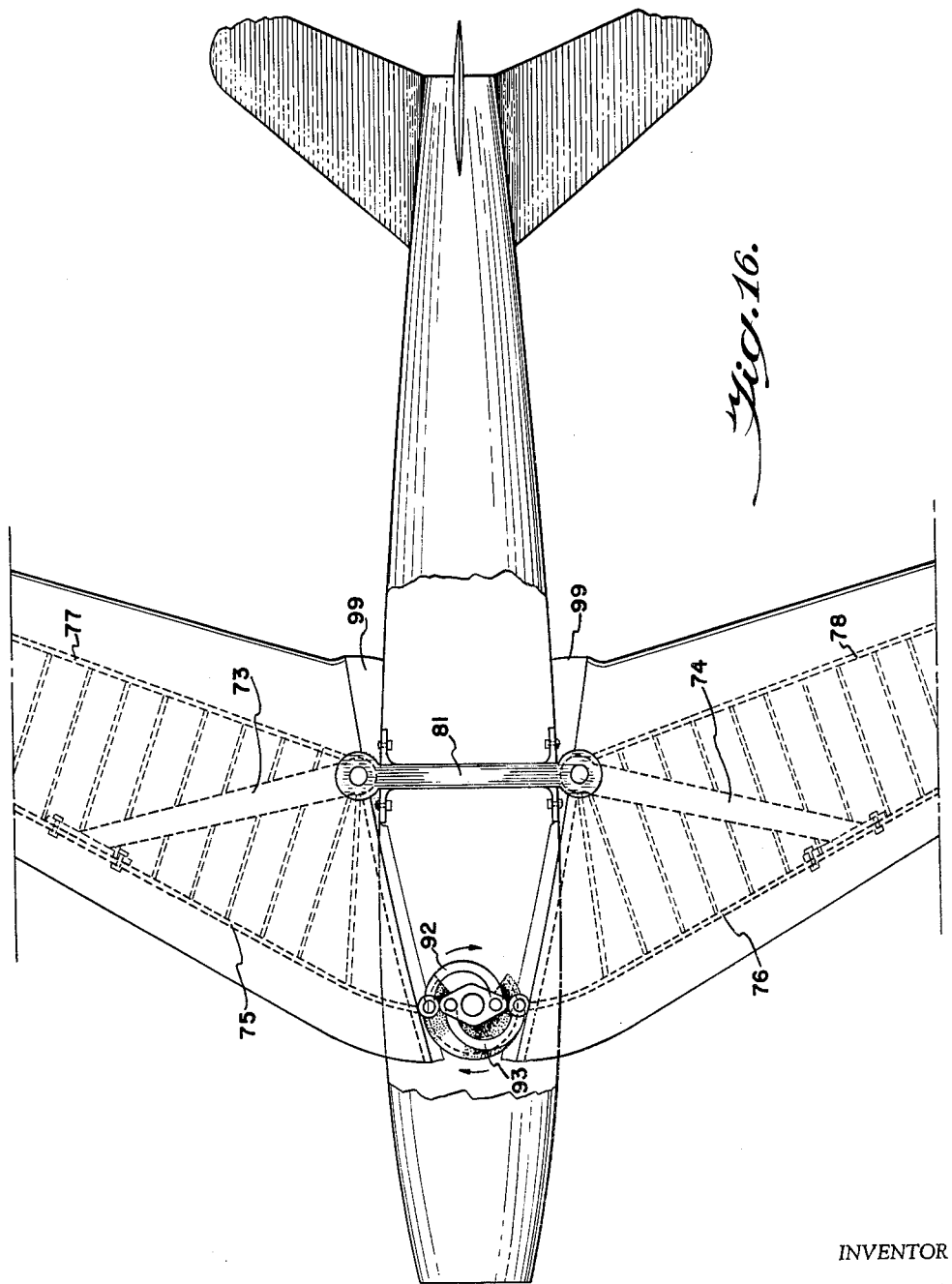
FIGURE 16 is a view like FIG. 15, but with the wings moved forward to a position of less sweep.

The structural features of the wing arrangement according to this invention are characterized by the use of an unswept spar 12 functioning as the main bending member of the wing when considered as a whole. The main spar 12 acts as a load-carrying attachment member which not only makes it possible to secure the wing halves to the fuselage quickly, but also makes interchangeability of sets of wings possible.

The main spar comprises right and left spar halves 13 and 14 respectively, the inboard ends 13' and 14' of the spar halves being shown in detail in FIGURE 2. The inboard ends 13' and 14' are cut in a wedge and a wedge-receiving configuration respectively, and suitable bolt-receiving holes 21a and 22a are located in wedge 13' and holes 21b and 22b are located in wedge-receiving member 14'. A spar receiving aperture 20 is provided in the fuselage 11 (see FIG. 6) and into this aperture are inserted the inboard ends of the spar halves when the wings are to be installed upon the fuselage.

When the inboard ends of the spar halves have been inserted into aperture 20 in the fuselage as shown in FIGS. 1, 3 and 5, the wedge and wedge-receiving ends 13' and 14' come into fitted relation, and holes 21a and 21b become aligned, as do holes 22a and 22b. This permits bolts 21 and 22 (or one bolt and one pin) to be inserted through the mating holes so as to fasten the spar halves securely together. The bolts are preferably fitted with nuts on their threaded ends, and because of this comparatively simple arrangement, it is possible for the spar halves to be secured together in a quick and simple manner. A horizontally disposed duct 37 may be provided in the fuselage as shown in FIGURE 3 to protect the wiring, control cables, and other components located in the fuselage when the wings are being installed. In such instance, appropriate holes or openings are provided in the duct to permit the bolts 21 and 22 to be installed or removed as may be desired. While the described construction for the inboard spar ends is preferred, it is to be understood that other suitable fittings may be employed if desired.

The outboard ends of spar halves 13 and 14 are respectively secured to swept front spars 15 and 16 at points intermediate the ends thereof, by the use of suitable bolts or the like. See FIGURES 1 and 3. Swept rear spars 17 and 18 may be employed in the swept wings according to this invention (see FIGS. 1 and 7) in which event their inboard ends may be secured to the respective spar halves 13 and 14 approximately at the locations of the root ribs 19'.

As may be desired, the swept front spars 15 and 16 may be secured by bolts or the like to appropriate fittings 15a and 16a mounted on suitable bulkheads of the fuselage forward of the main spar 12. Therefore, it is to be seen that both swept wings may be secured in flight position by approximately four fastening means; the bolts 21 and 22, and the bolts 15b and 16b associated with forward fittings 15a and 16a. This arrangement not only makes wing installation extremely rapid, but also it makes possible the use of wings which have not been uniquely fitted to the aircraft.

As previously indicated, the main spar 12 acts as a load-carrying attachment member for the wings of the airplane and may be considered as the main bending member of the wing when considered as a whole. Suitable fittings are provided so that vertical loads can be transferred effectively from the wings into the fuselage, and to this end, protrusions 27 are provided on the fore and aft sides of the spar halves 13 and 14 near the inboard ends thereof. These protrusions are arranged to be received in fork members 28 provided on each side of each aperture 20 of the fuselage. These forks are of sturdy construction and are mounted on suitable fuselage bulkheads so as to transmit the vertical forces from the wings into the fuselage. When the main spar ends 13' and 14' have been pushed into inter fitting engagement and bolts 21 and 22 employed to secure the ends together, the protrusions 27 will fit closely in forks 28 so as to bring about firm engagement between the wings and the appropriate structural members of the fuselage.

FIGURE 4 reveals a preferred construction for the main spar halves 13 and 14, and according to this arrangement, upper and lower spar caps 23 and 24 are provided. Upper spar cap 23 is provided with flanges 23a which are recessed somewhat with respect to the upper or outer surface of spar cap 23 to make possible the fitting of the front and rear sections of the upper wing skin 25 to spar cap 23 in a flush fitted manner. Similarly, lower spar cap 24 is equipped with recessed flanges 24a to make possible the connection of the lower spar cap 24 between the front and rear sections of the lower wing skin 26 in a flush fitted manner. The respective wing skins may be secured to these flanges by riveting or other techniques as may be desired. Upper spar cap 23 is also equipped with front and rear inturned flanges 23b which are disposed at approximately a 90° angle with respect to flanges 23a. To the forward and rear flanges 23b are secured shear webs 29 and 30, respectively, which are located between the upper and lower spar caps, being secured along their lower extremities to the flanges 24b of the lower spar cap 24. Rivets may be employed to secure each shear web to its respective flanges 23b and 24b. In this manner, it will be seen that the main spar may be constructed in the form of a box shaped structure that is secured directly to the upper and lower skins of the wings. Wherever the spar halves intercept a rib 19, rib flanges 19' are formed on the ribs to facilitate securing the ribs to the main spar such as by the use of rivets in the general manner illustrated in FIG. 4. The main spar in its end locations 13' and 14' may be substantially solid, or it may continue in the same general manner as the type of construction shown in FIG. 4. In latter event, suitable strengthening members may be provided in the wedge and wedge-receiving portions in the general manner illustrated in FIG. 1, to prevent the possible crushing of these portions when the bolts 21 and 22 are tightened.

According to a preferred arrangement, the structural backbone of each wing half is formed by a structural wingbox comprising a front spar, rear spar, ribs connected to the spars, and upper and lower wing skins. For example, and considering FIGURES 1 and 4, the structural wing box of the right wing consists of forward swept spar 15, rear swept spar 17, the ribs 19, and the upper and lower wing skins 25 and 26. These members are secured together into a structural configuration possessing great strength. Figuratively speaking, into this wing box is inserted the unswept spar half 13, which is secured therein. (Of course, as previously explained, portions of the main spar half 13 actually form part of the upper and lower surface of the wings and are secured to the intercepted ribs.) Because of the location of the spar half inside the structural wing box in the described manner, the spar half is effective to receive all loads of the skin more or less where these loads originate. It is important to note that the structural wing box does not function in a bending moment transmitting manner with respect to the fuselage, so that the box throughout its whole length becomes a bending member with maximum bending moment at the root; rather, the spar half 13 extends a substantial distance through the wing box to receive loads throughout substantially its entire length of contact with the wing, thereby making it unnecessary for bending to be transmitted the whole length of the wing. The load carried by each fiber of the wing skins is introduced directly to the main spar without going through the detour of stress collecting structure, such as local skin reinforcements. Therefore, the present design gives the shortest and least complicated flow of load from the wings into the fuselage.

As should be apparent, the main spar halves could be constructed so as to be separable from their respective structural wingboxes, but inasmuch as this would eliminate the integral construction that is effective for receiving wing skin loads wherever they occur, and in which the spar and skin bend conformed to each other under load, such construction is not the preferred one.

According to this invention, the main spar is preferably located in such a manner in each wing half that the center of lift of each wing half will occur on or near the main spar. The center of lift is usually out from the centerline of the airplane by approximately 42% of the span of the wing, and at a location of about 25% of the chord of the wing. As will be seen from the drawings, the main spar is so located so as to approximately coincide with the center of lift of the wings, and by virtue of this fact, the main spar 12 is the shortest line of construction between the centers of lift of the right and left wings, which results in the minimizing of bending moments, and makes possible main spar lengths as short as possible. Also, the present main spar construction makes unnecessary the collection of stresses distributed throughout the whole wing skin into smaller points of attachment for transfer into the fuselage.

Because wing loads are not carried over the whole length of the wing half to the root, but only to the main spar, no special fittings are necessary, thereby making possible the comparatively simple attachment described. Not only does this amount to economical construction that enables the wings to be assembled on the fuselage or removed therefrom in a short period of time, but also it makes possible the use of attachment bolts and fittings much smaller than would otherwise be possible. In prior art constructions, spars were typically secured to the fuselage by means of bolts located in the upper and lower portions of the spar. In this instance, the distance between the bolts was approximately equal to the thickness of the wing. To be contrasted with this is the present construction wherein bolts 21 and 22 are a distance apart of an order of magnitude approaching the width of the fuselage 11. As should be apparent, a given bending moment to be taken up by two bolts that are located a large distance apart makes it possible for smaller, lighter bolts to be used than would otherwise be necessary.

As previously indicated, according to prior art construction, it has been very difficult to design wings separable into two wing halves, and then construct a pair of wings to be interchangeable with the wings of another airplane of the same model. This is, of course, because the holes drilled in wing and fuselage, because of manufacturing tolerances, are almost invariably at distances that are distinct to that particular wing and fuselage, and it has been virtually impossible to substitute a new wing half on a given fuselage and then line up the holes in the proper manner to receive the wing bolts or other fittings. According to the present invention, because a minimum number of fasteners are employed and tolerances may be comparatively large, the right, wing of one airplane, for example, can be interchangeable with the right wing of any other airplane of that description.

The technique of construction swept wings according to this invention is easily applicable to constructions in which a single swept spar is utilized, as is to be seen in FIG. 8. In such a construction, the wing ribs can terminate at a suitable trailing edge member, and spoilers instead of conventional aileron and flap arrangements can be used for controlling the flight path of the aircraft.

Similarly, the present invention is adaptable to honeycomb construction as indicated in FIG. 9. In this embodiment, a wing half can be constructed utilizing full depth honeycomb core extending between the top and bottom skins of the wing. Neither front nor rear swept spars are necessary, for the wing skins can provide the aerodynamic shape, and provide bending and torsional strengths, with the honeycomb core transmitting the shear along the wing and maintaining the outer contour of the wing in the desired profile. In this instance, the main spar pierces the honeycomb core so to speak, and is bonded or otherwise secured to the upper and lower wing skins as well as the portions of the core it intercepts. This, of course, amounts to a stressed skin wing construction, which has proven to be quite satisfactory, and to be of very light weight.

This invention is also adaptable to honeycomb construction in which the wing halves are swept very highly and have high aspect ratio. Referring to FIGURE 10, if the main spar were designed to be straight, it would intersect the leading edge of the wing approximately 15% of the span, and in such instance, it would be quite short, and would not act as a bending member in the desired manner. Rather, it would be a stress collecting member with very high local stresses. Therefore, in instances such as this, I prefer that the main spar be normal to the direction of flight only in the fuselage, but being swept somewhat at the locations wherein it extends into the wing halves. In order that the structure between the centers of lift of the wing halves will be as straight as possible, the main spar is swept only as much as necessary in order for it to extend for a satisfactory distance within the wing.

The swept wing construction according to this invention lends itself very readily to a variable angle of incidence arrangement. In FIGURE 11, a swept wing embodiment is illustrated wherein main spar 42 consists of spar halves 43 and 44 joined in a manner similar to that described in conjunction with FIGURE 1, such as by the use of bolts 51 and 52. However, in this instance, the spliced end of each main spar half is inserted through a bushing 53 which has a substantially square or rectangular inner contour to receive the main spar end, but which has a circular exterior so that it can be rotatably mounted in the fuselage. Each bushing 53 is received in a stationary bearing 54 that is provided with a number of mounting holes 55 arranged about the periphery of the bearing so that it may be secured to appropriate fuselage structural members by the use of bolts 56 or the like. A wing incidence changing mechanism 57, about to be described, is provided adjacent the front or leading edge of the wing so that the angle of incidence of the wing may be varied, and appropriate slots are provided in the sides of the fuselage to permit vertical displacement of the front spars 45 and 46. Therefore, as the leading edge of the wing is moved with respect to the fuselage, the wing is rotated in bearings 54. Since the spar 42 is designed to extend through the centers of lift of the wing halves, a substantial amount of effort is not required to change the angle of incidence of the wing in most circumstances.

The wing incidence changing mechanim 57 principally consists of a motor 58, a large shaft 59 selectively rotatable in opposite directions by the motor, and push rod 61 and lever 62 interconnecting the shaft 59 with forward wing spars 45 and 46. A trunnion 63 is provided on the innermost end of each front spar, and rotatably attached to each trunnion is one of the push rods 61. Secured near the ends of the large shaft 59 are the levers 62, each of which is hingedly connected to the lower end of its respective push rod 61. The shaft 59 is rotatably mounted in suitable bearings 60, and as the shaft is caused to rotate in one direction or the other, the leading edge of the wings are caused to move accordingly.

Attached to the lower central portion of the shaft 59 is a lever 64, and to this lever is attached a connecting linkage from the motor drive mechanism, which in this instance is illustrated as a screw 65 of a screw jack mechanism. The motor 58 is arranged to drive in rotation an appropriate mechanism, such as a worm, for driving the screw, and although the circuitry associated with the motor is not shown, it is to be understood that the direction and speed of operation of the motor is under the control of the pilot. Alternatively, an automatic speed sensing device may be operatively connected to motor 58 so that the angle of incidence of the wings will be altered automatically to best meet the aerodynamic needs of the aircraft. It is to also be understood that other types of incidence changing mechanisms such as a hydraulic system may be employed if desired.

According to a further embodiment of this invention, the unswept spar for a swept wing concept is applicable to a construction in which the wing can be varied in sweep. As seen in FIG. 15, the wings may have front and rear swept spars 75, 76 and 77, 78, but instead of the halves of the main spar being joined directly together as in previous embodiments, the right and left spar halves 73 and 74 are instead hingedly connected by appropriate pins 82 and 83 to the respective ends of an appropriate carry-through member 81. The carry-through member 81 may be secured to appropriate structural members of the fuselage by means of flanges 84.

The variable sweep mechanism 87 principally consists of a motor 88 arranged to drive a worm 89a in rotation. The worm is in operative relation with worm gear 89b secured upon a large shaft 90 that is vertically disposed in the fuselage and rotatably mounted in bearings 90'. Also disposed upon shaft 90 are a pair of double ended levers 91, which are disposed in spaced relation to each other. Disposed between the spaced levers 91 are right and left curved members 92 and 93 which are hingedly connected by appropriate hinge bolts 94 and 95 to the respective ends of the double ended levers 91. To the outer ends of members 92 and 93 are connected the inboard ends of forward spars 75 and 76, respectively, such as by the use of hinge pins 96 and 97. The members of the variable sweep mechanism are of generally rugged construction so as to form a structure having great resistance to undesired deflection of the wings.

As an example of the operation of the variable sweep mechanism, when the worm gear 89b is caused by the motor 88 to rotate in the clockwise direction, for instance, the levers 91 are caused to rotate in the same direction, causing the members 92 and 93 to move so as to pull inwardly the inboard ends of the forward spars 75 and 76, to move the wings to positions of less sweep. As is apparent from FIG. 16, because of the curvature of members 92 and 93, the members 91 can be rotated approximately 180° or more to a position in which the wings are at substantially less sweep than the position shown in FIG. 15. Suitable fairing members 98 and 99 are provided at the locations wherein the wings join the fuselage, and these may be made of rigid material and arranged to move with respect to the fuselage in the manner shown in FIGS. 15 and 16 in order to accommodate changes in sweep of the wings. Alternatively, the fairings may be made of somewhat flexible material and fastened between wings and fuselage so as to permit, by its expansion and contraction, changes in sweep.

As should be apparent, the construction according to this invention may be utilized with wings having forward sweep, as well as with rearwardly swept wings as shown. Also, instead of the motor 88 being under control of the pilot, an automatic speed sensing mechanism may be operatively connected to the motor so that the sweep of the wings will be altered automatically to best meet the aerodynamic needs of the aircraft. Furthermore, other and different types of sweep changing mechanisms may be employed in place of mechanism 87 if desired.

By the practice of this invention, the stress transmitting structure of swept wing aircraft can be substantially lighter and far less costly than prior art arrangements. Additionally, assembly and disassembly of the wings from the fuselage can be accomplished in a very short period of time, inasmuch as a minimum of fastening means need be employed. When wings of variable incidence are being employed, only the two main spar fasteners 51 and 52, and the trunnions 63 are involved in the assembly of the wings onto the fuselage, or the removal therefrom. Similarly, in the variable sweep embodiment, to remove the right wing, for example, it would only be necessary to remove pins 82 and 96, which fact makes it possible to substitute a new wing in a minimum of time. The unswept main spar concept is applicable to constructions other than swept wings, and for instance, could be employed for swept tail surfaces.

Various changes may be made in the details of construction without departing from the spirit of the invention or sacrificing any of the advantages thereof.

I claim:

1. A swept aircraft wing comprising a main spar possessing substantially less sweep than the wing and arranged to function as the principal bending member of the wing, said wing being in two halves, a structural wing box in each wing half that includes at least one swept spar, a plurality of ribs connected to the swept spar, and upper and lower wing skins defining the external configuration of the wing, said main spar extending for a substantial distance into said structural wing box of each wing half and connecting to the swept spar thereof, the upper and lower wing skins of each wing half being connected to said main spar, whereby the bending loads of the wing are distributed over a substantial portion of said unswept spar.

2. The wing construction as defined in claim 1 wherein said main spar is constructed into two halves, each of said spar halves having an inboard end extending for a distance inboard of the root rib of its respective wing, said inboard ends being adapted to be removably secured together.

3. Swept aircraft wing construction utilizing an unswept spar as the principal bending member of the wing, comprising a fuselage, wing halves arranged to be removeably secured to each side of said fuselage, an unswept main spar extending through said fuselage and into each wing half for a substantial distance, said main spar being connected to said wing halves so as to form an integral part of the structure thereof, so that the loads upon the wing halves will be distributed over a substantial portion of the spar extending into each wing half, said main spar being constructed in two portions, with the ends of said spar portions being in a wedge and wedge-receiving configuration, joined together within said fuselage and held in interfitting engagement by at least one bolt extending therethrough.

4. The swept aircraft wing construction as defined in claim 3 in which mounting means are provided in said fuselage for receiving said ends of said spar portions, said means in said fuselage being rotatable so that the wing incidence can be changed, and incidence changing means for rotating said wing about said rotatable mounting.

5. A wing arrangement for a swept wing aircraft, utilizing as the principal bending member of the wing a main spar possessing substantially less sweep than the wing, comprising a fuselage, wing halves possessing sweep and arranged to be removably secured on each side of said fuselage, said wing halves each having at least one swept spar, and upper and lower wing skins secured to said swept spar and defining the external configuration of the wing half, a main spar constructed in two principal portions, with such portions each extending into a respective wing half for a substantial distance and connected to the swept spar of the wing half, the upper and lower wing skins of each wing half being connected to the respective portion of the main spar so that loads upon the wing halves will be distributed over a substantial extent of the length of said main spar, the inboard end of each main spar portion having support means for supporting the respective wing half in the proper relationship to said fuselage.

6. The wing arrangement as defined in claim 5 in which the inboard ends of said spar portions are joined together within the fuselage, said ends being in a wedge and wedge-receiving configuration, held in interfitting engagement by at least one bolt extending therethrough.

7. The wing arrangement as defined in claim 5 in which mounting means are provided in said fuselage for receiving said inboard ends of said main spar portions, said mounting means being rotatable so that the wing incidence can be changed, and incidence changing means for rotating said wing so as to bring about a change in incidence.

8. The wing arrangement as defined in claim 5 in which said fuselage includes a carry-through member for supporting said inboard ends of said main spar portions, hinge means for connecting said inboard ends to said carry-through member, and wing sweep changing means for varying the sweep of the wings by rotating them about said hinge means.

9. The wing arrangement as defined in claim 5 in which said upper and lower wing skins are interconnected by shear-bearing means in the form of honeycomb core.

10. The wing arrangement as defined in claim 5 in which shear-bearing means are employed in each wing half, latter means being in the form of forward and rear panels constituting with said upper and lower wing skins a wing box.

11. A wing arrangement for a swept wing aircraft, utilizing as the principal bending member of the wing a main spar possessing substantially less sweep than the wing, comprising a fuselage, wing halves possessing sweep and arranged to be removably secured on each side of said fuselage, a structural wing box in each wing half that includes at least one swept spar, a plurality of ribs connected to said swept spar, and upper and lower wing skins defining the external configuration of the wing half, a main spar constructed in two principal portions, with each portion extending into the structural wing box of a respective wing half and connected to the swept spar of the wing half, the upper and lower wing skins of each wing half being connected to the respective portion of the main spar so that loads upon the wing halves will be distributed over a substantial extent of the length of the main spar, the inboard end of each main spar portion having support means for supporting the respective wing half in the proper relationship to said fuselage.

12. The wing arrangement as defined in claim 11 in which the inboard ends of said spar portions are joined together within the fuselage, said ends being in a wedge and wedge-receiving configuration, held in interfitting engagement by at least one bolt extending therethrough.

13. The wing arrangement as defined in claim 11 in which mounting means are provided in said fuselage for receiving said inboard ends of said main spar portions, said mounting means being rotatable so that the wing incidence can be changed, and incidence changing means for rotating said wing so as to bring about a change in incidence.

14. The arrangement as defined in claim 11 in which said fuselage includes a carry-through member for supporting said inboard ends of said main spar portions, hinge means for connecting said inboard ends to said carry-through member, and wing sweep changing means for varying the sweep of the wings by rotating them about said hinge means.

15. In an aircraft having a fuselage, a stressed skin construction for swept wings comprising upper and lower wing skins defining the external contours of the wings, functioning as the principal bending members of the wings, and interconnected by means bearing the shear resulting from wing bending due to aerodynamic lift produced by the wing, and an integral load-bearing main spar having substantially less sweep than the wings and extended through the fuselage and for a substantial distance into each wing half, said skins being secured to said main spar at a plurality of points distributed along the adjacent surfaces of said main spar and said skins so that the bending loads carried by said stressed wing skins will be introduced to said main spar as a distributed load, whereby a maximum utilization of the material strength of the skins is accomplished and at the same time a direct transfer, without intermediate structural members, of the stress carried by said skins into said main spar.

16. In an aircraft having a fuselage, a stressed skin construction for swept wings comprising upper and lower wing skins defining the external contours of the wings, functioning as the principal bending members of the wings, and interconnected by means bearing the shear resulting from wing bending due to aerodynamic lift produced by the wing, and an integral load-bearing main spar having substantially less sweep than the wings and extended through the fuselage and for a substantial distance into each wing half, said skins being secured to said main spar continuously along adjacent surfaces of said main spar and said skins so that the bending loads carried by said stressed wing skins will be introduced to said main spar as a distributed load whereby a maximum utilization of the material strength of the skins is accomplished and at the same time a direct transfer, without intermediate structural members, of the stress carried by said skins into said main spar.

References Cited in the file of this patent

UNITED STATES PATENTS

| | | |
|---|---|---|
| 2,241,972 | Wagner | May 13, 1941 |
| 2,276,004 | Vidal | Mar. 10, 1942 |
| 2,603,437 | Satre | July 15, 1952 |
| 2,744,698 | Baynes | May 8, 1956 |

FOREIGN PATENTS

| | | |
|---|---|---|
| 609,313 | Great Britain | Sept. 29, 1948 |